July 23, 1940.　　　　　C. BREER　　　　　2,208,625
VEHICLE
Filed Dec. 31, 1936　　　2 Sheets-Sheet 1
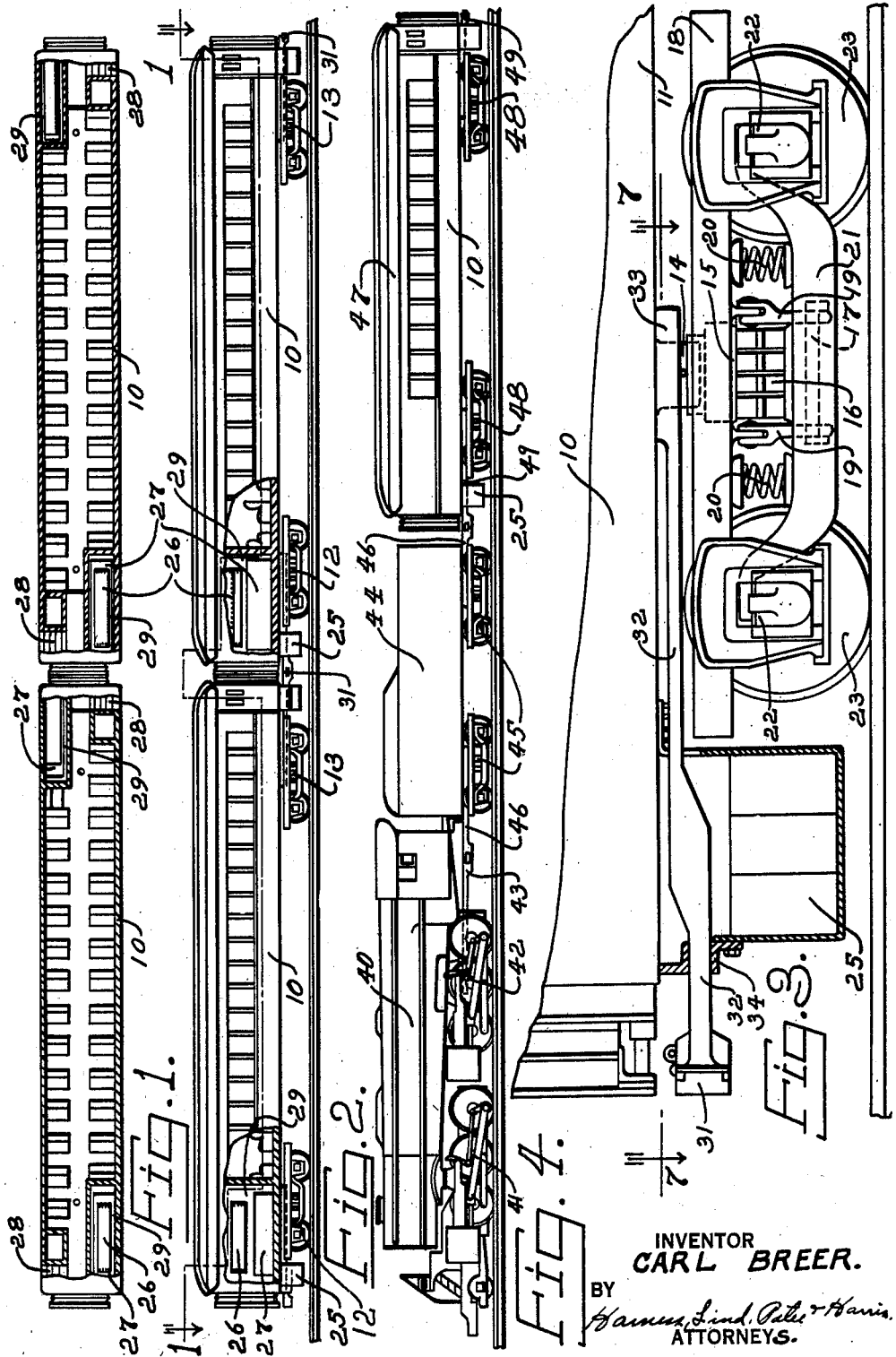
INVENTOR
CARL BREER.
BY
ATTORNEYS.

July 23, 1940.　　　　C. BREER　　　　2,208,625
VEHICLE
Filed Dec. 31, 1936　　　2 Sheets-Sheet 2
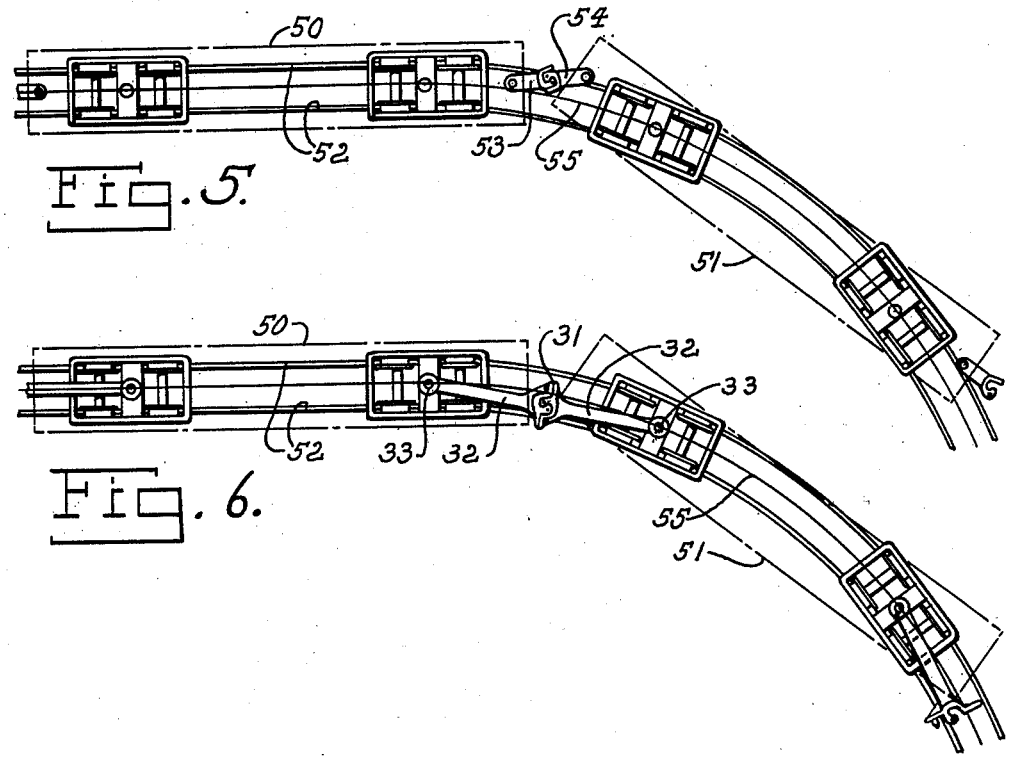
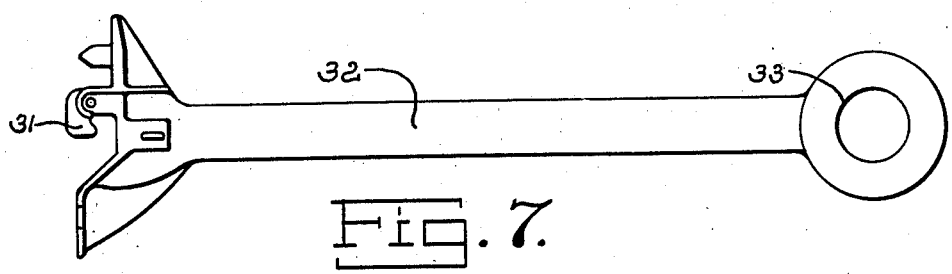
INVENTOR
CARL BREER.
BY
ATTORNEYS.

Patented July 23, 1940

2,208,625

UNITED STATES PATENT OFFICE 2,208,625

VEHICLE

Carl Breer, Grosse Pointe, Mich., assignor to Chrysler Corporation, Highland Park, Mich., a corporation of Delaware Application December 31, 1936, Serial No. 118,501

14 Claims. (Cl. 105—3)

My invention relates to vehicles and it has particular relation to railway vehicles and improvements therein.

More specifically, my invention relates to a novel arrangement of parts which serves to improve the riding qualities of such railway vehicles, both cars and locomotives, and at the same time serves to decrease the wear and tear on the rails and on the wheels and trucks of the cars and locomotives.

The object of my invention is to provide railway equipment which provides smoother, more comfortable, riding qualities and which at the same time both reduces wear and tear on the rolling equipment and permits of operating that equipment at higher speeds with greater safety than has heretofore been possible.

In the present type of railway equipment it is customary to employ a chassis frame of considerable length and to mount the wheel trucks as close to the ends thereof as the coupling and drawbar equipment will permit, in order to keep the maximum flange load imposed on the wheels while passing around curves as low as possible and in order to provide the maximum amount of unobstructed space on the car frame beneath the car body between the trucks to be utilized for mounting the storage batteries, electric generator, air brake appurtenances, air conditioning equipment and other units employed in operating the car or train. As most of this equipment must be of very sturdy construction and is, as a result, very heavy, this arrangement of parts necessitates the use of a very strong and heavy car body frame in order to be sufficiently rigid because most of the units of concentrated weight are disposed at some distance longitudinally of the frame from the truck supporting centers.

It is apparent that the forces which interfere with a smooth and even ride in a car are generally imparted thereto either by irregularities in the rails on which the wheels roll, or by the drawbar assembly by which each car is connected fore and aft of the next adjacent cars. In addition, it frequently occurs that the end of one car body frame will frictionally engage the end of the next adjacent car body frame, particularly in rounding curves, imparting a sideways or lateral thrust thereto. As the rails are subject to irregularities in both a vertical and a lateral direction corresponding disturbing forces are imparted to the car body through the springs of the trucks. The drawbar assemblies are generally of such nature that they are incapable of transmitting vertical forces from one car body to another but they do transmit lateral forces therebetween, and, being mounted directly on the ends of the car body frames, such forces are transmitted undiminished directly thereto at a point which, because of its distance from the center of the car, has the disadvantage of a relatively great leverage. In like manner the bumping of the car ends produces a relatively hard shock to the next adjacent car which is particularly effective in jolting the car because of the leverage of the point at which the shock is transmitted.

As a result of concentrating the heavy equipment near the center of the car body, or sprung mass, it has a relatively small moment of inertia opposing any forces applied to the ends of the car body in either a vertical or lateral direction. In addition, it is an established fact that where the moment of inertia of a body is small the center of percussion with respect to a point of impact near one end thereof as an axis is disposed relatively close to the center of gravity. Also, it is a well known fact that the center of percussion of a sprung mass is subjected to no bodily movement when the mass is subjected to a blow or impact but that the sprung mass pivots about the center of percussion as an axis.

In any railway car, if its units of concentrated weight are disposed near the center of the car body, and a vertical or a lateral force is imposed on the sprung mass by the front truck, due to rail irregularities, the sprung mass, consisting of the car body and its chassis frame with the operating equipment mounted thereon, pivots about its corresponding center of percussion as an axis, which, owing to the concentration of weight near the center of the car, is located between the center of gravity of the car, disposed near the center of the car, and the rear truck. This movement of the car body about a center disposed ahead of the rear truck causes the rear end of the body, including that portion over the rear truck, to move downwardly when the front end is moved upwardly and to move to the right when the front end of the car moves to the left, or vice versa.

Under the previously described conditions, the downward movement of the rear end of the car body compresses the springs of the rear truck, despite the fact that the wheels of the rear truck have not yet encountered the same rail irregularity. The rear springs, being compressed, exert an upward force on the rear end of the car body and it moves upwardly in response thereto. The force of the rear springs being exerted only on one end of the car body causes it to move about its corresponding center of percussion as an axis which, because of the concentration of weight near the center of the car, is disposed between the center of the car and the front truck, causing the front end of the car to move downwardly again compressing the springs of the front truck, whereupon the same cycle again occurs. This is called secondary spring reaction and continues until the force in question is entirely dissipated. At some later instant, depending on the speed of the train, the wheels of the rear truck encounter the same track irregularity and again the cycle or series of cycles is repeated. At times the two forces and movements become additive and the results are correspondingly more severe.

In like manner if a lateral thrust is imparted to a car body, having its mass disposed as described, by the front truck, caused by a rail irregularity, it will cause a movement of the rear end of the car, including the portion over the rear truck, in the opposite direction about its corresponding rear center of percussion, which may differ from the center of percussion with respect to a vertical force, depending upon the disposition of the mass of the sprung body, but which is generally fairly close to the center of percussion with respect to a vertical force transmitted by the same truck. When the rear end of the car body, suspended on its swing links, becomes displaced with respect to the rear truck it tends to swing back to a normal position over the rear truck and in so doing causes the car body to swing about its corresponding front center of percussion as an axis, which is likewise located between the center of the car and the front truck, thus displacing the front end of the car body with respect to the front truck and the cycle is ready to repeat itself again. Again, the rear truck repeats the same performance when the wheels thereof encounter the same rail irregularity, and the secondary reactions caused thereby continue until the forces thereof are entirely dissipated.

The lateral displacement of the car body due to rail irregularity is particularly aggravating because the drawbar assemblies transmit a lateral force from the end of one car to the end of the next adjacent car because, if the car bodies are each moving about axes disposed between the centers of the cars and their trucks, and with the drawbar assemblies pivotally secured to the car bodies near the ends thereof, any turning of one car about such an axis will cause considerable lateral movement of the end of the car which in turn jerks or pulls the drawbar assembly mounted thereon at a considerable angle and the lateral displacement of one car is thereby transmitted to the next adjacent car. Each car therefore receives at least two jerks from every car in the train passing over the rail irregularity, and may receive many more if the various secondary reactions are at all severe.

In like manner, a pull by the engine on the drawbar assembly when the train is rounding a bend, or when one car is laterally displaced with respect to its trucks will cause a lateral displacing force to be transmitted through the drawbar assemblies from one end of the train to the other, which sometimes operates very much like the childhood game of crack-the-whip, with the rearmost cars receiving the most severe effects. Observation indicates that when a train moving at a high rate of speed is derailed due to track irregularities, the car next to the end of the train generally leaves the rails first, pulling the other cars with it. This is likely due to the whip cracking effect coupled with the fact that the end car, having no rear drawbar connection whereby to transmit any of its lateral disturbing force to the next succeeding car jerks violently on its sole drawbar connection and this force, coupled with that received from the car in front, is sufficient to unbalance the next to the last car first.

Lateral forces transmitted by the end of one car body engaging the end of the next adjacent car body are likewise transmitted by the drawbar assemblies or by the actual engagement of the ends of the car bodies throughout the length of a train in a similar manner and with similar effects.

In practicing my invention I prefer to distribute the mass thereof so as to place the center of percussion with respect to a vertical force imparted by the front truck to the sprung mass of the car at a point on or adjacent the effective center of suspension of the rear truck, so that the springs of the rear truck are neither compressed nor expanded by a vertical force exerted by the front truck, causing movement of the body, thereby eliminating secondary spring reaction. At the same time I prefer to arrange the various mass units along the car body frame so that the center of percussion with respect to a lateral force exerted on the car body by the front truck occurs at a point on the center of suspension of the swing links of the rear trucks, thus eliminating any bodily lateral movement of the car body over the rear truck, to be later corrected. In like manner the centers of percussion with respect to either vertical or lateral forces imparted to the sprung mass by the rear truck will occur at a point or points substantially on the center of suspension of the front truck.

By my invention I have moved the drawbar assembly connection from the car body near the end thereof to the center pivots of the trucks, thus causing any lateral forces imposed thereby on a car body to be exerted on the sprung mass at a point corresponding substantially to the center of application of disturbing forces arising from rail irregularities and for which axis of rotation, as already pointed out, the corresponding center of percussion is located at a point substantially on the center of suspension of the truck at the opposite end of the vehicle, thus preventing the transmission of any lateral disturbing forces from one car to another through the drawbar assemblies.

Also, by lengthening the drawbar assemblies and employing a rigid type of coupling which prevents slack in the coupling union and prevents buckling of the combined drawbars at the coupling union, I have eliminated the possibility of having the end of one car body strike against or frictionally engage the end of the next adjacent car body, which sets up lateral disturbances which interfere with an easy comfortable ride to the passenger.

For a better understanding of my invention reference may now be had to the accompanying drawings, of which:

Fig. 1 is a plan view, partially in section, of two railway cars, constituting part of a train of cars, and constructed in accordance with my invention.

Fig. 2 is a side elevation, partially in section, of the two cars illustrated in Fig. 1.

Fig. 3 is an enlarged detail view, partially in side elevation, of one end of one car body and its associated truck, with parts broken away for the sake of clarity, and illustrating in detail one embodiment of my invention.

Fig. 4 is a side view of a locomotive, its tender, and the first of a train of cars coupled thereto.

Fig. 5 is a diagrammatic representation of two conventional cars entering a curved section of track connected together by conventional drawbar assemblies.

Fig. 6 represents the same cars on the same track but with the cars equipped with my novel arrangement of drawbar assemblies.

Fig. 7 is a plan view of a drawbar assembly constructed in accordance with my invention.

In the drawings I have illustrated a car body 10 having the usual supporting or chassis frame 11 which is of relatively rigid construction. This car body, in the usual manner, is mounted upon a front truck 12 and a rear truck 13, which are substantially identical in construction. The car body is provided at each end with a center pivot 14 which rest upon and pivotally engage a center bearing on bolsters 15 of the trucks 12 and 13, thus permitting rotation of each of the trucks as a whole with respect to the car body. The bolster 15 rests, at each end, on bolster springs 16, which may be of any desired type but are here shown as being of the flat multiple leaf spring type, which permits resiliently controlled vertical movement between the car body and the truck frame. The bolster springs 16 rest upon the bolster spring plank or bar 17 which extends transversely across the truck and each end of which is supported from the truck frame 18 by means of a pair of pivoted swing links 19, which links permit lateral movement of the car body with respect to the truck frame. The truck frame 18 rests on equalizer springs 20 which can be of any type but are here shown as of the coil spring variety, which in turn rest on equalizer bars 21, disposed one on each side of the truck. The equalizer bars 21 in turn rest, at their ends, on the journals 22 of the car wheels 23.

Vertical movement may occur between the bolster and the bolster spring plank and between the truck frame and the equalizer bar, or, in other words, between the car body and the truck frame and between the truck frame and wheels. Also, lateral movement may occur between the car body and the truck frame, and pivotal movement about a vertical axis passing through the center pivot 14 may occur between the car body and the truck frame.

It should be noted that the bolster springs 16 and the equalizer springs 20 are symmetrically arranged with respect to the wheels 23 so that the effective center of vertical springing is at the center of each truck which coincides with the axis of the center pivot 14. Likewise, the swing links 19 are symmetrically disposed with respect to the truck wheels and therefore with respect to the axis of the center pivot 14. As a result, the axis or center of rotation of the truck with respect to the car body is the effective center of suspension of the unit, both with respect to vertical and lateral movement.

In order to increase the moment of inertia of the car body, so as to more effectively oppose lateral and vertical movement thereof, I have moved a considerable portion of the operating equipment, particularly the equipment of concentrated weight, to the ends of the car body. Thus it will be noted that most of the units which have heretofore been suspended from the car body at points between the trucks are disposed at the ends of the car body, some over the trucks and some between the trucks and the ends of the car body. For example, storage batteries 25, which are very heavy, are at the extreme ends of the cars. Air storage tanks 26 and air conditioning equipment 27 are likewise removed from the center of the car body and moved to the ends.

The construction of the car body differs from standard construction in that it has but a single passenger loading platform 28 at each end of the car, they being disposed at opposite sides of the car, thus permitting the loading and discharging of the passengers on either side of the car. The space at the ends of the car normally occupied by the other two loading platforms is formed into compartments 29, which may be of any length desired, for the housing of equipment of various types. Also, the elimination of the additional sets of passenger steps permits of placing equipment, such as the storage batteries 25, beneath the car body at the extreme ends thereof without interfering with the operation of the drawbar assembly 30, it being particularly desired to place as much of the weight of the car as possible at the extreme ends thereof. By this means the moment of inertia of the car body, including as much as the truck as moves with the car body, may be materially increased. In addition, the removal of the weight of this equipment from the long span between the trucks permits of employing a car body frame of lighter construction than has heretofore been feasible, thus permitting a smaller total weight of car without reduction of safety of any portion thereof.

By placing the units of greatest concentrated weight as close to the ends of the car as possible I have insured a considerable moment of inertia of the car body which opposes any forces applied thereto adjacent the ends of the car in either the vertical plane by the wheels or in a transverse direction by the wheels or by an adjacent car body. As is well known, any given body which is free to move has a center of percussion for any given axis of rotation, and if the axis of rotation passes through the body the center of percussion with respect to that axis will occur within the body on the opposite side of the center of gravity from that axis. Also that by increasing the mass concentrated at the ends of any object, such as a railway car, the moment of inertia thereof is increased thus moving the center of percussion with respect to a point of impact adjacent one end of the car to a point adjacent the opposite end of the car. By a proper weight distribution the center of percussion with respect to an impact at any given point may be located at any desired point within a reasonable range.

As both vertical and lateral disturbing forces are transmitted to the sprung mass from the rails through the trucks it is desirable to locate the center of percussion with respect to an impact received by the front truck at a point approximately on the center of suspension of the rear truck and to locate the center of percussion with respect to an impact received by the rear truck at a point approximately on the center of suspension of the front truck. By shifting the proper amount of weight to the ends of the car bodies, which amount varies with different types of cars and with different types of construction, or by shifting the trucks longitudinally of the car body this may readily be accomplished. When properly arranged the two centers of percussion occur on the two centers of suspension and there is no secondary reaction due to displacement of the car body with respect to its trucks due to any disturbing force transmitted thereto by the rails.

In the present application the term "drawbar assembly" is intended to include the entire mechanism associated with each car to connect it to the next adjacent car. The drawbar assembly 30 therefore includes a coupling mechanism 31, a drawbar 32, and a journal 33 by which the drawbar assembly is connected to the center pivot 14. The coupling mechanism 31 should preferably be of a type which rigidly connects the drawbars of the two adjacent cars to make a rigid connection which permits of no bending or relative movement of the two bars at the coupling connection.

Having disposed the weight of the sprung mass so that impacts or forces imposed on the sprung mass at the centers of suspension thereof produce no reaction on the opposite center of suspension it is desirable to so connect the drawbar assemblies between adjacent cars that any lateral disturbing forces transmitted through the drawbar assemblies shall be transmitted to the car bodies at the same axes. In order to do so I have pivotally secured the drawbar assembly 30 to the center bearing 14 of the adjacent truck. The end of each drawbar is, of course, laterally slidably supported upon a guide 34, permitting angular movement of the drawbar with respect to the body when the train is passing around curves in the track, or switching from one track to another one. Each drawbar assembly is of such length that when coupled to a corresponding drawbar of an adjacent car, the car bodies are always maintained in spaced relationship. This prevents the possibility of lateral disturbing forces arising through the ends of adjacent cars engaging each other while they are passing around curves, over switches and the like. It is, of course, essential that the vestibule connections, including the floor plates, between adjacent cars be so arranged that they move freely with respect to each other so that no lateral or vertical forces could be transmitted thereby from one car body to another.

With the drawbar assemblies connected to the center of suspension, and with the car ends prevented from engaging each other, all of the forces which serve to cause movement of the car which interferes with the comfort of the passenger are concentrated at the two centers of suspension and with the mass so distributed that the center of percussion with respect to a point of application of a force at one center of suspension is disposed at the other center of suspension all secondary reactions of such forces will be eliminated, whether they arise from the wheels or the drawbar forces, and none of such forces will be transmitted from car to car by the drawbar assembly.

Although my invention is illustrated with the type of truck using swing links and spring planks commonly employed on passenger car trucks it will be obvious that the advantages thereof will likewise accrue to any type of equipment employed and that it lends itself equally well to embodiment in all types of cars or locomotives.

Although the herein described construction and arrangement of parts finds its greatest utility when embodied in passenger cars it can likewise be employed to great advantage in locomotives, as illustrated in Fig. 4, and in freight cars. This is true because, as it adds no parts not heretofore used but permits of using a lighter weight car body frame construction, owing to the fact that the heavy operating units are mounted close to the trucks at the ends of the car body. In addition, the elimination of all secondary reactions and the prevention of the transmission of disturbing forces from one car body to another reduces wear and tear on both the rails and the cars and permits the use of higher speeds without danger of derailment. Also readily damaged or delicate merchandise can be hauled more safely over greater distances in a shorter time than has heretofore been possible.

In Fig. 4 I have illustrated a steam locomotive 40 of the articulated type wherein the drivers are mounted on two pivotally mounted trucks 41 and 42. The various units of the locomotive are so distributed with respect to the center of suspension of the two trucks that the center of percussion with respect to an axis of rotation disposed in a vertical plane passing through the center of suspension of the front truck occurs substantially in the vertical plane passing through the center of suspension of the rear truck and in like manner the center of percussion with respect to an axis of rotation disposed in a vertical plane passing through the center of suspension of the rear truck occurs substantially on the center of suspension of the front truck. As a result, any lateral movement of the front part of the main locomotive body pivots about the center of suspension of the rear truck as a vertical axis but produces no lateral bodily movement thereof. It is, therefore, desirable to secure the drawbar assembly 43 at the center of suspension of the rear truck as lateral movement of the front part of the locomotive cannot be transmitted therefrom by the drawbar assembly connecting the locomotive to the coal tender 44.

In like manner the tender 44 is provided with two pivoted trucks 45 and drawbar assemblies 46. A car 47, which is a passenger car, but could equally well be a freight car, is also provided with two spaced pivoted trucks 48 and a drawbar assembly 49 at each end. The disposition of the sprung mass of the coal tender 44 and of the car 47 is similar to that described in connection with the locomotive 40 and with the cars illustrated in Figs. 1 to 3, so that any lateral or vertical forces imparted to the bodies thereof by either truck will cause a movement of the corresponding end of the body about the center of suspension of the second truck as an axis, thus preventing any bodily displacement of the car bodies to be later corrected with their attendant reactions.

By pivotally connecting the drawbar assemblies of both the tender and the car to their respective centers of suspension certain advantages follow. Any bodily displacement of the front end of the tender will cause movement of the tender body about the center of suspension of its rear truck as an axis, but as no bodily displacement of the body takes place at that point, the drawbar assembly is not moved thereby and therefore cannot transmit any such forces to the next succeeding car. Any lateral or vertical displacement of the rear truck of the tender will cause a bodily displacement of the rear part of the tender and may cause a tension on the drawbar assemblies connecting it to the car 47 and cause a bodily displacement of the front end thereof, but the car 47 will, in turn, move about the center of suspension of its rear truck as an axis and will exert no force on the rear drawbar assembly thereof. As a result, it is apparent that any displacement of one end of a car cannot be transmitted by the drawbar assemblies beyond the opposite end of the same car in one direction or beyond the next adjacent car in the other direction.

It will, of course, be understood that it is not always possible to arrange the masses on the sprung body so that the centers of percussion will fall exactly on the center of suspension of the two trucks, and this is particularly true where variable loads and variable arrangements of those loads may occur. As a result, it is at times possible only to locate the centers of percussion in approximation to the correct location for perfect results. However, considerable advantages are obtained even if the centers of percussion cannot be located as desired because the amount of bodily movement of a car end with respect to its supporting truck may be very materially reduced, as is obviously desirable, by moving the centers of suspension as far as conditions will permit. It likewise follows that considerable advantages are secured by connecting the drawbar assemblies to the centers of suspension even though the centers of percussion cannot be controlled as desired.

In practical operation the weight and mass distribution varies a fair amount between a fully loaded car and an empty car, chiefly because the passengers or merchandise to be hauled may be, to an undesirable degree, concentrated in the span between truck centers. For this reason it is desirable to distribute the weights of the car equipment so that when the car is loaded with an average load distributed in the usual manner the centers of percussion will be properly located. In some instances this means that the weights must be so distributed that when the car is empty the two centers of percussion occur closer to the ends of the car than are the centers of suspension, so that when the load is added thereto the centers of percussion will be moved towards the center of the car to positions substantially on the centers of suspension. As this condition will vary with operating conditions the weights should preferably be arranged bearing in mind the service to which the car will be put in order to secure the best results.

Another feature which my invention comprehends is the elimination of sudden acceleration and subsequent deceleration of the cars of a train with respect to each other as the train enters or leaves a curve in the track or passes from a left hand curve to a right hand curve or vice versa. This is an additional advantage occurring from connecting adjacent cars together by means of connections extending between the centers of the trucks rather than between the ends of the car bodies.

This feature can best be understood by reference to Figs. 5 and 6 of the drawings of which Fig. 5 illustrates diagrammatically the several successive positions of the drawbars between two conventional cars and Fig. 6 illustrates diagrammatically the corresponding positions of the drawbars of cars constructed in accordance with my invention.

In Fig. 5 two cars 50 and 51 are illustrated with car 50 on a straight portion of a track 52 and about to enter the curve and car 51, which precedes car 50 and pulls it through the coupled drawbar assemblies 53 and 54, respectively, is already on the curve. The curvature of the track is exaggerated for purposes of illustration. The drawbar 53 is secured to the front end of car 50 in the uusal manner and drawbar 54 is likewise secured to car 51. It is apparent from this illustration that as the point of connection of the drawbar 54 and car 51 swings outwardly about the rear truck center as an axis the combined drawbars are pulled into an angular relation with respect to car 51 and with respect to the centerline 55 of the track 52.

As the drawbars are of fixed length the car 50 must move faster than car 51 to permit the drawbars to move to the angular position shown. This causes a sudden acceleration of short duration of car 50 and of any succeeding cars which is unpleasant to the passengers and in addition causes undue strains on the drawbar mechanism because all of the cars to the rear of the car entering the curve are suddenly accelerated at the same time. As the drawbars, at the time this acceleration occurs, are disposed at an angle to the direction of movement of the cars the horizontal component of the drawbar pull represents an important lateral disturbing force, and, as the angularity of the drawbars with respect to the centerlines of the connected cars changes rapidly as the trailing car enters the curve, the lateral forces exerted on the cars due to the angularity of the drawbars undergoes successively rapid increase and decrease, which is exerted both on the rear end of the leading car and the front end of the trailing car. This means also that each car entering a curve is accelerated with respect to the preceding car as long as the angularity of the drawbars with respect to the car centerlines increases and is immediately thereafter decelerated as the car enters the curve sufficiently to decrease the angularity of the drawbars with respect to the car centerlines.

It thus appears that each car entering a curve is successively accelerated and decelerated corresponding to increase and decrease in drawbar angularity, with the accompanying approach and separation of adjacent cars, which accelerations and decelerations are, of course, transmitted to adjacent cars. On leaving a curve, a similar cycle is obtained, again starting with accelerating forces accompanying increased angularity of the drawbars and being followed by decelerating forces as the cars leave the curve and the angularity of the drawbars decreases.

In the structure shown in Fig. 6, which represents one form of my invention, the conditions are materially different. In this illustration the combined drawbars are connected between truck centers, in accordance with my invention. In this figure it will be noted that the drawbar connections fall wholly within the track centerline 55 so that the force exerted thereon tends to pull car 50 into the curve, rather than out of it, and therefore aids in overcoming the centrifugal forces acting on car 50, instead of being additive therewith. In tests conducted with two corresponding sets of cars, the cars of Fig. 6 will adhere to the tracks without derailment at speeds from 15 to 35% higher than will cars connected as shown in Fig. 5.

It will also be apparent that as the distance between truck centers of adjacent cars remains constant at all times there is no acceleration of the trailing cars when the train enters a curve nor is there any deceleration thereof as the train leaves the curve, thus contributing to the comfort of the passenger.

The combined drawbars must, of course, move out of alignment with the centerlines of the two cars but the degree of angularity therebetween is relatively small as compared with that of Fig. 5, and, with the successive strains of accelerations and decelerations eliminated it is apparent that the drawbars are subjected to materially smaller strains because of my invention.

It is thus apparent that by my invention I have improved the riding qualities of trains by a novel distribution of weight with respect to the centers of support and by a novel arrangement of the drawbar assemblies with respect to the cars and locomotive. The novel distribution of weight serves to eliminate the vertical spring reactions as well as lateral reactions transmitted thereto by the rails or by the drawbar assemblies from the adjacent end of the next car. The novel type of drawbar connections between cars serves to prevent the transmission of distributing forces throughout the train, exerts a force opposing the centrifugal force exerted on a car, eliminates sudden accelerations and decelerations of the cars, and decreases the stresses and strains on the drawbar connections, the trucks and the rails. These factors combine to provide a more comfortable ride at higher speeds with greater safety and with lower maintenance costs of both rolling stock and rails.

In the drawings I have disclosed a steam locomotive and tender. Obviously the same invention may be embodied in an electric locomotive, Diesel driven locomotive, or any other type of power unit or vehicle.

Although I have illustrated several forms which my invention may assume and have described in detail several applications thereof it will be apparent to those skilled in the art that it is not so limited, but that various modifications, changes and adaptations thereof may be effected therein without departing from the spirit of my invention or from the scope of the appended claims.

What I claim is:

1. In combination, a series of vehicles each comprising a relatively rigid sprung mass mounted on two spaced pivoted trucks, said sprung mass being so distributed with respect to said trucks that the center of percussion with respect to an axis of rotation passing through the pivotal axis of one of said trucks occurs approximately at the pivotal axis of the second truck and each of said trucks being pivotal relative to said mass independently of pivotal movements of the other truck, each vehicle being connected to the next adjacent vehicle by a drawbar assembly of which the points of application of force occur at approximately the pivotal connections of adjacent trucks.

2. In combination, a series of vehicles each comprising a relatively rigid sprung mass mounted on two spaced pivoted trucks, said sprung mass being so distributed with respect to said trucks that the center of percussion with respect to an axis of rotation passing through the pivotal axis of one of said trucks occurs approximately at the pivotal axis of the second truck and each of said trucks being pivotally movable relative to said mass independently of the other truck, each vehicle being connected to the next adjacent vehicle by a drawbar assembly bearing directly on said sprung mass at the pivotal connection of the rear truck of one vehicle to the front truck of the next adjacent vehicle.

3. In combination, a vehicle, a second vehicle adapted to be drawn by the first vehicle, said second vehicle consisting of a relatively rigid body mounted on front and rear sets of wheels both pivotally connected to said body, the mass of said body being so distributed with respect to said sets of wheels that the center of percussion with respect to a vertical axis of rotation in the vertical plane of the effective center of the rear set of wheels passes through the effective center of the front set of wheels, and means for drawing the second vehicle comprising a member connected at one end to the first vehicle and connected at its other end to the second vehicle at a point in a vertical plane substantially coinciding with the aforesaid center of percussion thereof.

4. In combination, a vehicle, a second vehicle adapted to be drawn by the first vehicle, each of said vehicles consisting of a substantially rigid body pivotally mounted about vertical axes on a pivotally connected rear set of wheels and a pivotally connected front set of wheels, each set of wheels being so disposed with respect to the distribution of mass of its associated body that the center of percussion with respect to the vertical axis of rotation in the vertical plane of the effective center of one set of wheels falls in a vertical plane which substantially coincides with the vertical plane of the effective center of the other set of wheels of the same vehicle, a connection between the vehicles for drawing the second vehicle from the first vehicle comprising means in effect interconnecting a vertical axis passing through the rear center of percussion of the first vehicle with a vertical axis passing through the front center of percussion of the second vehicle.

5. In combination, two spaced rail cars each comprising a relatively rigid car body mounted on two spaced trucks by means of pivotal connections, the mass of each car body being so distributed with respect to its supporting trucks that the center of percussion with respect to an axis of rotation in a plane passing through the pivotal axis of one truck occurs at a point adjacent the pivotal axis of the other truck, each of said trucks being pivoted relative to said body independently of pivotal movement of the other trucks and each of said cars being provided with drawbar assemblies the effective points of application of force of which occur at points approximately in vertical alignment with the centers of percussion of the adjacent ends of the car bodies, and means for coupling together the free ends of the drawbar assemblies of adjacent cars, said coupled drawbar assemblies being adapted to maintain said car bodies in spaced relationship and to transmit all forces therebetween.

6. In combination, a series of vehicles each comprising a car body supported on spaced sets of wheels, drawbar assemblies interconnecting the adjacent ends of successively arranged vehicles and attached directly to the bodies thereof, the points of application of force through each of the drawbar assemblies on each body being so disposed with respect to the distribution of mass of said body that the center of percussion with respect to the point of application of force of one drawbar assembly on the car body as an axis of rotation occurs at a point in vertical alignment with the point of application of force of the other drawbar assembly on the car body.

7. In combination, a rail vehicle comprising a substantially rigid car body having a non-uniform mass distribution along the length thereof, said rigid car body being spring-suspended on front and rear sets of wheels, pivotal means connecting said body and said sets of wheels so constructed and arranged as to accommodate relative vertical and lateral movement therebetween, said pivotal connecting means being so positioned longitudinally of the car body with respect to the distribution of mass thereof that any movement in either a vertical or transverse direction imparted to the body by one set of wheels will cause a movement of the body about an axis passing through the axis of the pivotal connecting means of the other set of wheels.

8. In combination, a series of rail vehicles each comprising a substantially rigid car body having a non-uniform mass distribution and having relatively greater mass concentrations at the ends than at the center thereof, each of said car bodies being spring-suspended on front and rear sets of wheels, means including a pivot connecting said body and said sets of wheels so constructed and arranged as to accommodate relative rotational, vertical and lateral movement therebetween, said pivot of said connecting means being so positioned longitudinally of the car body with respect to the distribution of mass thereof that any movement in either a vertical or transverse direction imparted to the body by one set of wheels will cause a movement of the body about an axis substantially passing through the axis of the pivot of the connecting means of the other set of wheels, drawbar assemblies interconnecting adjacent vehicles at said pivots, said drawbar assemblies being so constructed and arranged that all forces transmitted from one vehicle to the next adjacent vehicle must pass therethrough and so that any movement imparted thereby to the car body in a transverse direction will cause a movement of the body about an axis substantially passing through the axis of the pivot of the connecting means of the set of wheels supporting the opposite end of the car body.

9. In combination, a rail vehicle comprising a substantially rigid car body spring-suspended on front and rear sets of wheels, pivotal means connecting said body and sets of wheels so constructed and arranged as to accommodate relative vertical and lateral movement therebetween, said car body having sufficient mass concentrated at the ends thereof and said pivotal connecting means for said sets of wheels being spaced far enough apart longitudinally of the car body that any movement in either a vertical or transverse direction imparted to the body by one set of wheels will cause a movement of the body about an axis passing in proximity to the axis of the pivotal connecting means of the other set of wheels.

10. In combination, a series of vehicles each comprising a car body having a non-uniform mass distribution along its length, spaced sets of wheels for supporting each of said car bodies, means pivotally connecting said body and each set of wheels including a bolster and mechanism arranged to vertically movably and laterally swingably support the latter on said wheels, pivotal elements on said car body connecting it with each of said bolsters respectively for relative pivotal movement about vertical axes, said pivotal elements being so positioned longitudinally of said car body with respect to the distribution of mass thereof as to coincide with the conjugate centers of percussion of said car body, whereby any movement of one end of said body in any of the directions accommodated by said connecting means and imparted to said body by one set of wheels will cause a movement of the body about an axis passing through the pivotal connection of the other set of wheels, and drawbar assemblies directly connecting the car body carried pivotal elements of adjacent ends of adjacent vehicles.

11. A rail vehicle comprising a substantially rigid car body, a pair of trucks under said car body, each of said trucks having a center bearing pivotally supporting said car body, operating equipment carried by said car body, the major portion of the mass of said equipment being so distributed between said center bearings and the extremities of said car body as to make the conjugate centers of percussion of the combined mass of said car body and equipment substantially coincide with the axis of said center bearings.

12. In combination, a series of rail vehicles, each of said rail vehicles comprising a substantially rigid car body, a pair of trucks under said car body, each of said trucks having a center bearing pivotally supporting said car body, operating equipment carried by said car body, the major portion of the mass of said equipment being so distributed between said center bearings and the extremities of said car body as to make the conjugate centers of percussion of the combined mass of said car body and equipment substantially coincide with the axis of said center bearings, and drawbar assemblies connecting adjacent rail vehicles, said drawbar assemblies being arranged so that the points of application of the forces transmitted through said drawbar assemblies occur at the pivotal connections between the car bodies and the trucks of the adjacent vehicles.

13. In combination, a series of rail vehicles, each of said vehicles having a car body with the mass thereof non-uniformly distributed along its length and with greater concentrations of mass at the ends than at the center thereof, a pair of longitudinally spaced trucks under each car body, each of said trucks having a center bearing pivotally supporting the car body, said center bearings being so positioned relative to the car body as to coincide with the conjugate centers of percussion of the car body, and a drawbar assembly between adjacent vehicles connecting said vehicles, each of said drawbar assemblies having its opposite ends arranged for pivotal movement on an axis substantially coinciding with that of the center bearings of the trucks at the adjacent ends of said vehicles.

14. In combination, a series of vehicles each comprising a car body having a non-uniform mass distribution and having relatively greater mass concentrations at the ends than at the center thereof, spaced sets of wheels supporting each car body, drawbar assemblies interconnecting adjacent vehicles, said drawbar assemblies being arranged so that the points of application of the forces transmitted through said drawbar assemblies coincide with the conjugate centers of percussion of the car bodies.

CARL BREER.